US008898418B2

(12) United States Patent
Strutt

(10) Patent No.: US 8,898,418 B2
(45) Date of Patent: Nov. 25, 2014

(54) METHOD, APPARATUS AND COMPUTER PROGRAM FOR PROVISIONING A STORAGE VOLUME TO A VIRTUAL SERVER

(75) Inventor: Stephen P. Strutt, Bucks (GB)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 12/990,683

(22) PCT Filed: Jul. 28, 2009

(86) PCT No.: PCT/EP2009/059746
§ 371 (c)(1),
(2), (4) Date: Nov. 9, 2010

(87) PCT Pub. No.: WO2010/023052
PCT Pub. Date: Mar. 4, 2010

(65) Prior Publication Data
US 2011/0289500 A1  Nov. 24, 2011

(30) Foreign Application Priority Data

Aug. 26, 2008  (EP) ..................................... 08162989

(51) Int. Cl.
*G06F 12/00* (2006.01)
*G06F 3/06* (2006.01)
*G06F 9/50* (2006.01)

(52) U.S. Cl.
CPC ............ *G06F 9/5077* (2013.01); *G06F 3/0604* (2013.01); *G06F 3/0665* (2013.01); *G06F 3/067* (2013.01)
USPC ................................. 711/170; 711/E12.084

(58) Field of Classification Search
USPC .......................................... 711/170, E12.084
See application file for complete search history.

(56) References Cited

U.S. PATENT DOCUMENTS

| 4,916,608 A | 4/1990 | Shultz |
| 5,414,851 A | 5/1995 | Brice, Jr. et al. |

(Continued)

FOREIGN PATENT DOCUMENTS

WO  03027856 A1  4/2003

OTHER PUBLICATIONS

Anja Kruger, PCT, "Notification of Transmittal of the International Search Report and the Written Opinion of the International Searching Authority, or the Declaration", International Application No. PCT/EP2009/059746, Date of Mailing Dec. 14, 2009, 7 pages.

(Continued)

*Primary Examiner* — Larry Mackall
(74) *Attorney, Agent, or Firm* — Andrea Bauer; Hoffman Warnick LLC

(57) ABSTRACT

A provisioning apparatus operable with a virtualisation layer in a server, for provisioning a storage volume associated with a physical storage device to a virtual server in a storage area network. The provisioning apparatus includes a discovery component for transmitting a request to the virtual server to identify one or more storage volumes, and a receiving component for receiving a first unique identifier associated with the or each located storage volume from the virtual server. A comparing component determines from configuration data associated with the or each located storage volume a second unique identifier associated with the each of the located storage volumes. A comparing component compares the or each first unique identifier received from the virtual server with the or each of the second unique identifier associated with the configuration data to find a matching identifier.

21 Claims, 6 Drawing Sheets

(56) References Cited

U.S. PATENT DOCUMENTS

| | | | |
|---|---|---|---|
| 5,784,702 A | 7/1998 | Greenstein et al. | |
| 6,023,706 A | 2/2000 | Schmuck et al. | |
| 6,032,216 A | 2/2000 | Schmuck et al. | |
| 6,145,028 A | 11/2000 | Shank et al. | |
| 6,597,956 B1 | 7/2003 | Aziz et al. | |
| 6,640,278 B1 | 10/2003 | Nolan et al. | |
| 6,748,429 B1 | 6/2004 | Talluri et al. | |
| 6,769,071 B1 | 7/2004 | Cheng et al. | |
| 6,801,992 B2 | 10/2004 | Gijjar et al. | |
| 6,880,002 B2 | 4/2005 | Hirschfeld et al. | |
| 6,895,485 B1 * | 5/2005 | DeKoning et al. | 711/170 |
| 6,898,705 B2 | 5/2005 | Abboud et al. | |
| 6,985,937 B1 | 1/2006 | Keshav et al. | |
| 6,990,478 B2 | 1/2006 | Loy et al. | |
| 7,010,532 B1 | 3/2006 | Stakutis et al. | |
| 7,174,550 B2 | 2/2007 | Brice, Jr. et al. | |
| 7,213,065 B2 | 5/2007 | Watt | |
| 7,272,799 B2 | 9/2007 | Imada et al. | |
| 7,275,059 B2 | 9/2007 | Stakutis et al. | |
| 7,657,613 B1 * | 2/2010 | Hanson et al. | 709/220 |
| 2004/0117539 A1 | 6/2004 | Bennett et al. | |
| 2004/0123029 A1 * | 6/2004 | Dalal et al. | 711/114 |
| 2005/0223005 A1 | 10/2005 | Shultz et al. | |
| 2006/0064523 A1 | 3/2006 | Moriki et al. | |
| 2006/0075199 A1 | 4/2006 | Kallahalla et al. | |
| 2006/0161753 A1 * | 7/2006 | Aschoff et al. | 711/170 |
| 2006/0236068 A1 | 10/2006 | Li et al. | |
| 2006/0253658 A1 | 11/2006 | Mathieu et al. | |
| 2007/0100979 A1 | 5/2007 | Soland et al. | |
| 2007/0283119 A1 | 12/2007 | Sarkar et al. | |

OTHER PUBLICATIONS

Anja Kruger, PCT, "Declaration of Non-Establishment of International Search Report", International Application No. PCT/EP2009/059746, Date of Mailing Dec. 14, 2009, 2 pages.

T. Robertson, International Bureau of WIPO, "Amendment Under Article 19", Dated Nov. 2, 2010, 6 pages.

* cited by examiner

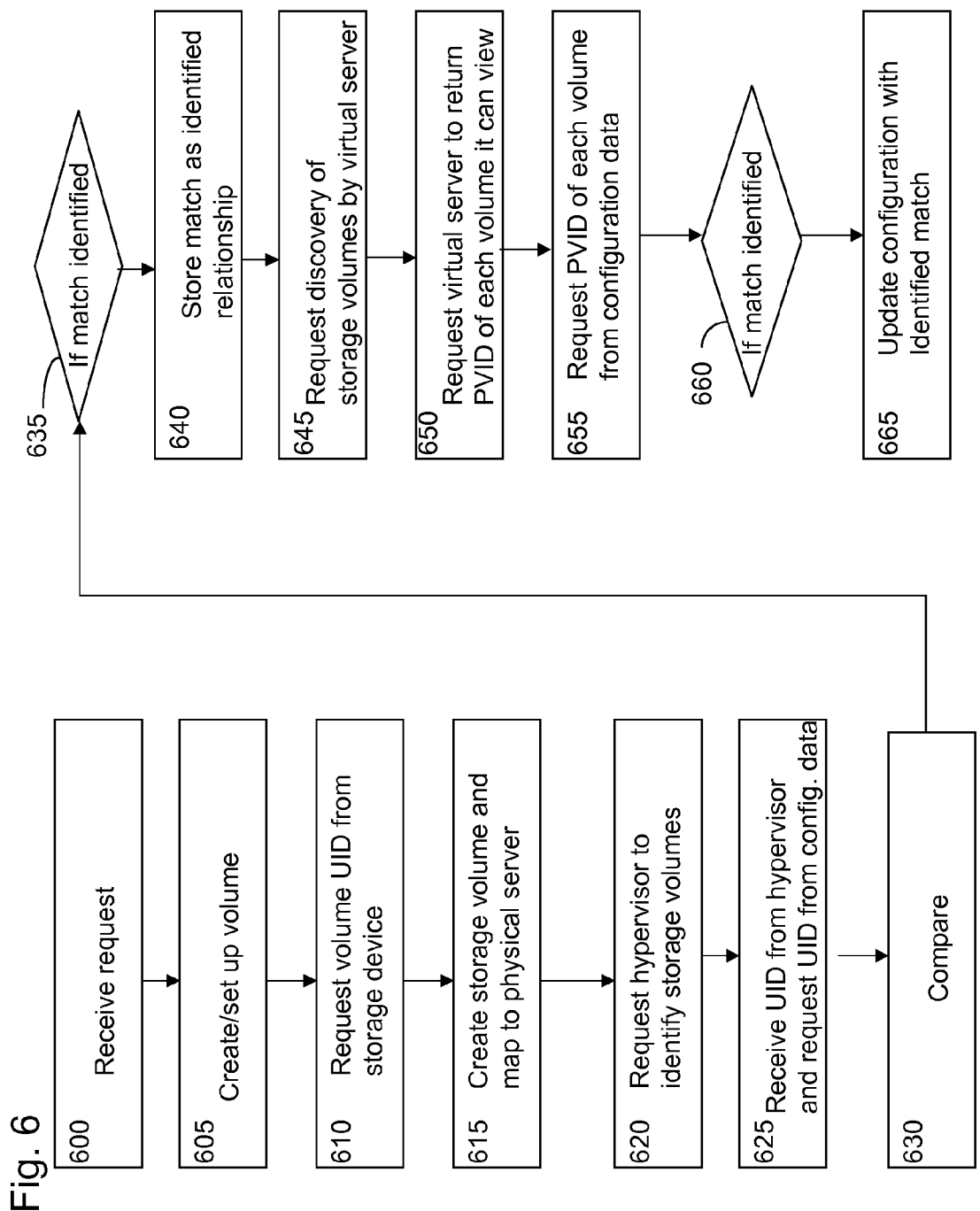

METHOD, APPARATUS AND COMPUTER PROGRAM FOR PROVISIONING A STORAGE VOLUME TO A VIRTUAL SERVER

FIELD OF THE INVENTION

The invention relates to the field of storage area networks. In particular the invention relates to a method, apparatus and computer program for provisioning a storage volume to a virtual server.

BACKGROUND OF THE INVENTION

A storage area network (SAN) is a specialised high speed network which is operable for the attachment of servers and storage devices. A SAN allows an 'any-to-any' connection across the network, using interconnected elements such as routers, hubs, switches and directors. A SAN eliminates the traditional dedicated connection between a server and a storage device. A SAN also eliminates restrictions to the amount of data that a server can access, currently limited by the number of storage devices, which can be attached to the individual server.

In a storage area network, server and storage resources need to be allocated on demand whenever there is a requirement to create a new IT service. Typically, in such an environment, storage is connected to a physical server. However, in an environment where a server is virtualised to create a number of virtual servers running on the physical server, problems are encountered when ensuring that a virtual server 'sees' the same physical storage as the physical server.

In this context, the provisioning of storage to a server means the allocation of new storage on an external disk array, allocation of the storage to the server and preparing the storage for application usage by the configuration of volume managers and the creation of file systems.

State of the art provisioning tools exist to perform automated end-to-end provisioning of storage in a physical server environment. However, in a virtual server environment, existing storage provisioning techniques need enhancement to support one or more virtual servers.

This is because the physical server is not aware of a server virtualization layer which enables the virtualisation of server resources. A virtualisation layer is also known in the art as a hypervisor.

The resources of the physical server hosting the virtual servers comprise processors, network connectivity and storage. The management of the physical server resources and the sharing of the resources between multiple virtual servers are handled by a hypervisor.

However, the hypervisor is limited to assigning resources that it has direct control over. Typically this includes the physical components of the server such as processors, memory, network adapters, serial adapters, DVD drives etc. These are hardware attributes of the physical components of the server system and can typically only be changed by the physical addition of new hardware. However, a hypervisor can only assign storage that it can physically access and is already aware of. For example, a hypervisor can assign disk storage that is directly associated with a physical server via an internal chassis or external storage on an external disk array that has already been assigned to the physical server and made available to the hypervisor. When a user requests the hypervisor to assign storage to a virtual server, it can only use existing storage that is already physically assigned to the physical server and can be accessed via the hypervisor.

Dedication and pre-allocation of storage resources to a physical server to meet a potential requirement that may not materialise is not desirable. This leads to unused and wasted resources that cannot be used by other physical servers and runs counter to the concept of a utility computing environment where resources are only assigned when required. Consequently, in an environment where multiple physical servers exist, each hosting virtual servers, it is desirable to assign storage to a physical server when it is required by a virtual server. State of the art hypervisors do not have this capability to automatically assign additional storage on demand from an external disk array.

SUMMARY OF THE INVENTION

One of the objectives of server virtualisation is to mask the complexities of the physical environment in which the virtual server is operating within and present server resources in a uniform fashion independent of the characteristics of the physical hardware. In a physical server environment external disk storage requires vendors and device specific multi-pathing device drivers. This requires installation of environment specific device drivers at the operating system level. To support the usage of unmodified operating systems in a virtual server environment without the requirement to install storage vendor specific drivers, disk storage is presented by a hypervisor to the operating system in the virtual server as a generic storage device such as a SCSI or IDE drive. Usage of disk drive types natively supported in the operating system eliminates issues of incompatibility and version support and eliminates the requirement to load vendor and device specific device drivers for the storage device. These aspects of server virtualisation enable the masking of the physical characteristics of external disk storage from the virtual servers.

Viewed from a first aspect, the present invention provides a provisioning apparatus operable with a virtualisation layer in a server, for provisioning a storage volume associated with a physical storage device to a virtual server in a storage area network, the provisioning apparatus comprising: a discovery component for transmitting a request to the virtual server to identify one or more storage volumes; a receiving component for receiving a first unique identifier associated with the or each located storage volume from the virtual server; a comparing component for determining from configuration data associated with the or each located storage volume a second unique identifier associated with the each of the located storage volumes; and a comparing component for comparing the or each first unique identifier received from the virtual server with the or each of the second unique identifier associated with the configuration data to find a matching identifier.

Preferably, the present invention provides an apparatus wherein if a matching first unique identifier is located, the identified match is recorded in the configuration data by the comparing component.

Preferably, the present invention provides an apparatus wherein the or each first unique identifier is written to a sector of the storage volume by the virtualisation layer on creation of the storage volume.

Preferably, the present invention provides an apparatus wherein the virtualisation layer comprises a hypervisor.

Preferably, the present invention provides an apparatus further comprising a discovery component for transmitting a request to a storage device to identify one or more storage volumes created on the storage device.

Preferably, the present invention provides an apparatus wherein the discovery component receives from the storage device a third unique identifier associated with the or each identified storage volume.

Preferably, the present invention provides an apparatus wherein the third unique identifier is written to the configuration data associated with the or each of the identified storage volume by the discovery component.

Preferably, the present invention provides an apparatus further comprising a further discovery component for instructing the virtualisation layer to identify one or more storage volumes created on the storage device.

Preferably, the present invention provides an apparatus wherein the further discovery component receives from each of the storage volumes a fourth unique identifier and a further comparing component for requesting from the configuration data the second unique identifier associated with the or each of the storage volume and the further comparing component being operable for comparing the fourth unique identifier with the second unique identifier to locate a matching identifier.

Preferably, the present invention provides an apparatus wherein if a matching second unique identifier is located, the further comparing component records the identified match in the configuration data.

Viewed from a second aspect, the present invention provides a method operable with a virtualisation layer in a server for provisioning a storage volume associated with a physical storage device to a virtual server in a storage area network, the method comprising the steps of: transmitting a request to the virtual server to identify one or more storage volumes; receiving a first unique identifier associated with the or each located storage volume from the virtual server; determining from configuration data associated with the or each located storage volume a second unique identifier associated with the each of the located storage volume; and comparing the or each first unique identifier received from the virtual server with the or each of the second unique identifier associated with the configuration data to find a matching identifier.

Preferably, the present invention provides a method wherein if a matching first unique identifier is located, recording the identified match in the configuration data.

Preferably, the present invention provides a method further comprising the steps of writing a first unique identifier to the sector of the or each storage volume by the virtualisation layer on creation of the storage volume.

Preferably, the present invention provides a method wherein the virtualisation layer comprises a hypervisor.

Preferably, the present invention provides a method further comprising the steps of transmitting a request to a storage device to identify one or more storage volumes created on the storage device.

Preferably, the present invention provides a method wherein the step of transmitting further comprises the step of receiving from the storage device a third unique identifier associated with the or each identified storage volume.

Preferably, the present invention provides a method further comprising the step of writing to the configuration data the third unique identifier associated with the or each of the identified storage volume.

Preferably, the present invention provides a method further comprising the step of instructing the virtualisation layer to identify one or more storage volumes created on the storage device.

Preferably, the present invention provides a method further comprising the step of receiving from each of the storage volumes a fourth unique identifier and a further comprising step of requesting from the configuration data the second unique identifier associated with the or each of the storage volume and further comprising the step of comparing the fourth unique identifier with the second unique identifier to locate a matching identifier.

Preferably, the present invention provides a method if a matching second unique identifier is located, the method further comprises recording the match in the configuration data.

Viewed from a third aspect, the present invention provides a computer program product loadable into the internal memory of a digital computer, comprising software code portions for performing, when said product is run on a computer, to carry out the invention as claimed described above.

BRIEF DESCRIPTION OF THE DRAWINGS

Embodiments of the present invention will now be described, by way of examples only, with reference to the accompanying drawings in which:

FIG. 6 is a flow chart detailing the process steps of the configuration component, in accordance with a preferred embodiment of the present invention.

DETAILED DESCRIPTION OF THE INVENTION

Figure 1:
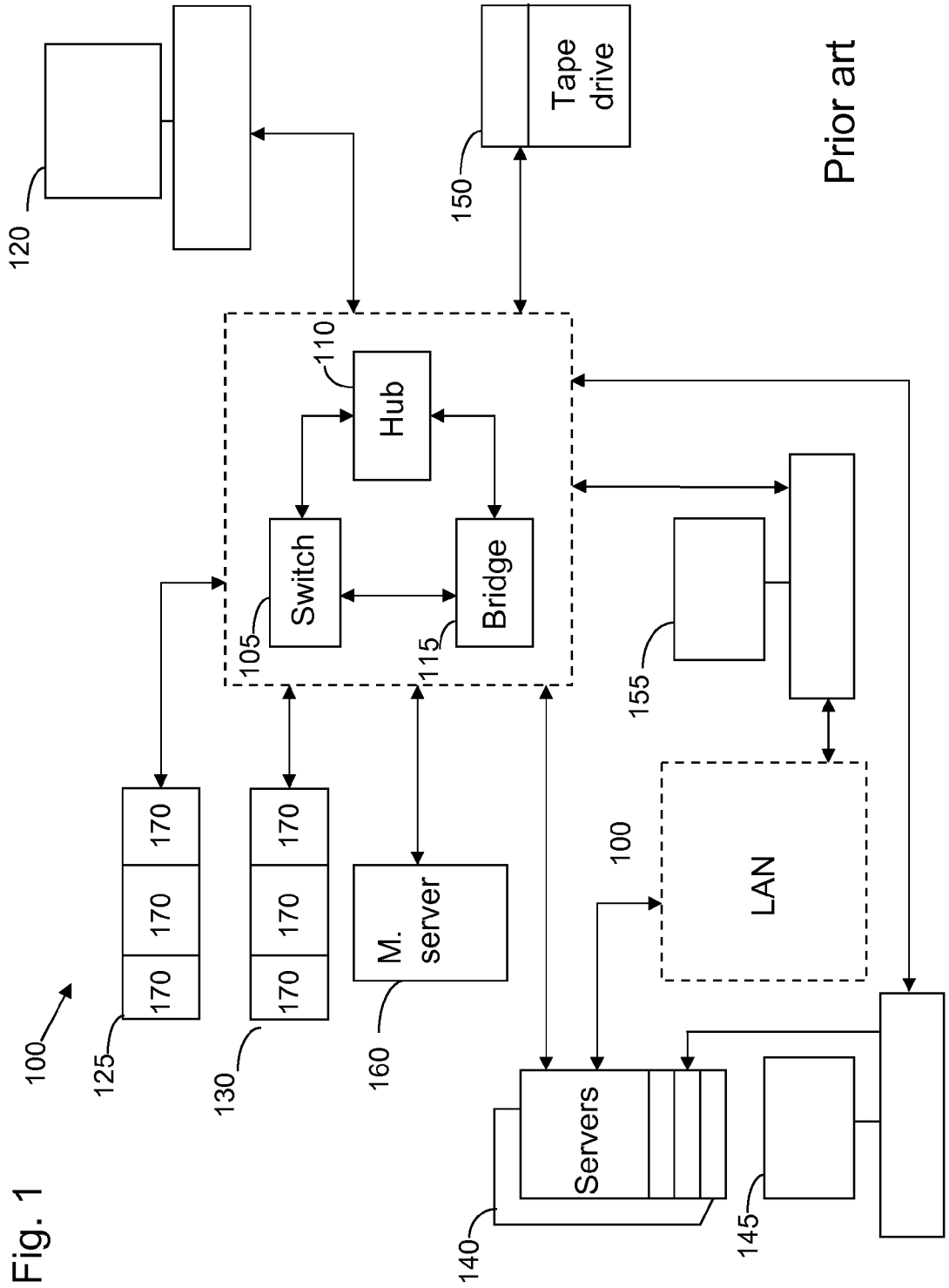
FIG. 1 is a block diagram of storage area network as is known in the art.

FIG. 1 shows a typical storage area network 100 (SAN). The SAN 100 comprises many different hardware components—the totality of which make-up the (SAN) 100. The SAN allows an 'any-to-any' connection across the network 100, using interconnect elements such as switches 105, hubs 110, and bridges 115. These interconnect elements perform such functions as data frame routing, media and interface conversion (i.e. copper to optical fibre), network enhancement and bandwidth management. The interconnect elements also provide for the connection of hardware peripherals such as, primary storage devices 125, 130 (for example RAID systems) servers 140 and back-up systems such as tape drives 150. Other types of hardware peripherals connected to the SAN 100 are computer systems 120, 145, 155. Data to be accessed or stored is located on storage systems 125, 130 such as, for example RAID storage system.

Each storage device 125, 130 comprises one or more storage volumes 170. Typically, storage volumes 170 are presented to the operating system as an abstraction of a physical disk. A storage volume is treated by the operating system as if it were a separate physical disk.

A physical server 140 may also run a number of virtual servers. A virtual server is operable for running its own operating system and is considered to be an independent operating environment that uses virtual resources. Consequently, a virtual server will require access to one or more storage volumes.

Typically, a management server 160 is installed which manages the storage devices 125, 130 connected to and connected from the SAN 100. Typically, a provisioning tool (not shown) is installed on the management server 160 for providing functions such as, creating, assigning and managing storage assigned to a physical server.

Figure 2:
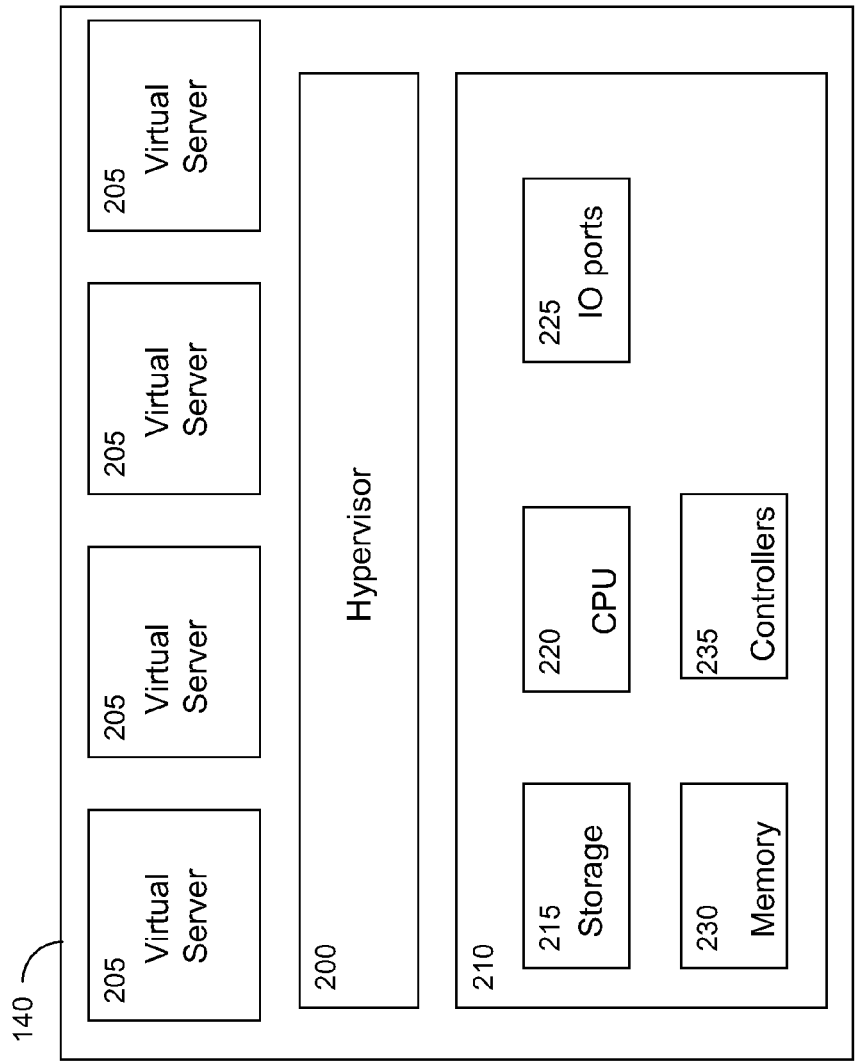
FIG. 2 is a block diagram of server, running a hypervisor and a plurality of virtual servers as is known in the art.

FIG. 2 details a server 140 having one or more hardware resources 210, such as for example, storage 215, CPU 220, IO ports 230, memory 235 and controllers 240. Running above the hardware resources 210 is a hypervisor 200. A hypervisor 200 is a software and/or firmware component that allows a number of virtual servers 205 to be created on the same physical server 140 and for each of the virtual servers 205 to run its own independent operating system independently of each other.

Figure 3:
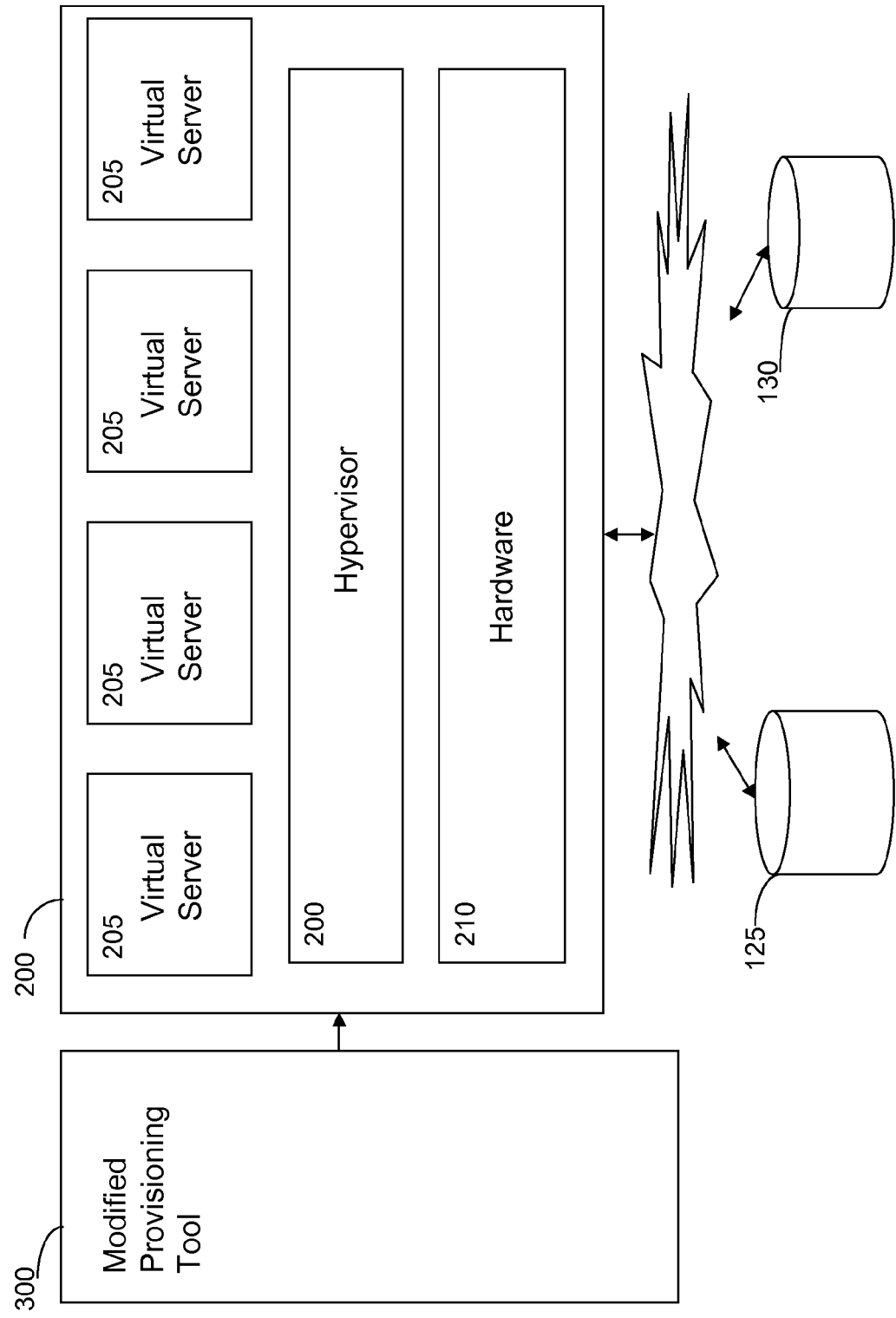
FIG. 3 is a block diagram of a modified provisioning tool operable with a server and a plurality of virtual servers in accordance with a preferred embodiment of the present invention.

FIG. 3 details again a server 140, having hardware resources 210 further comprising storage 125, 140 attached via the SAN 100, a hypervisor 200 and a number of virtual servers 205. However, in order to successfully provision storage 125, 130 to a number of virtual servers 205 a modified provisioning tool 300 running on a management server 160 is shown.

Figure 4:
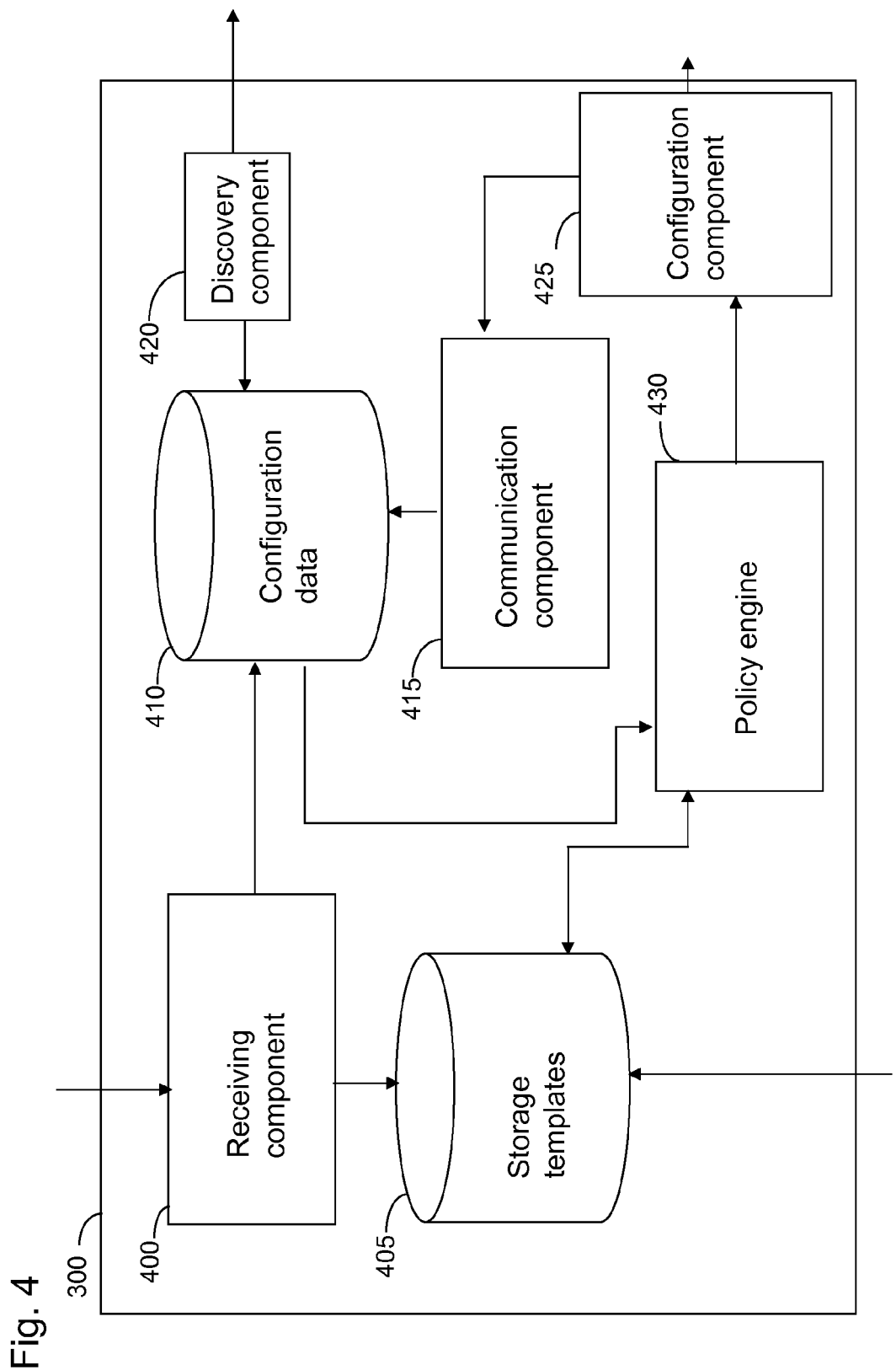
FIG. 4 is a block diagram of the components of the modified provisioning tool of FIG. 3, in accordance with a preferred embodiment of the present invention.
Figure 5:
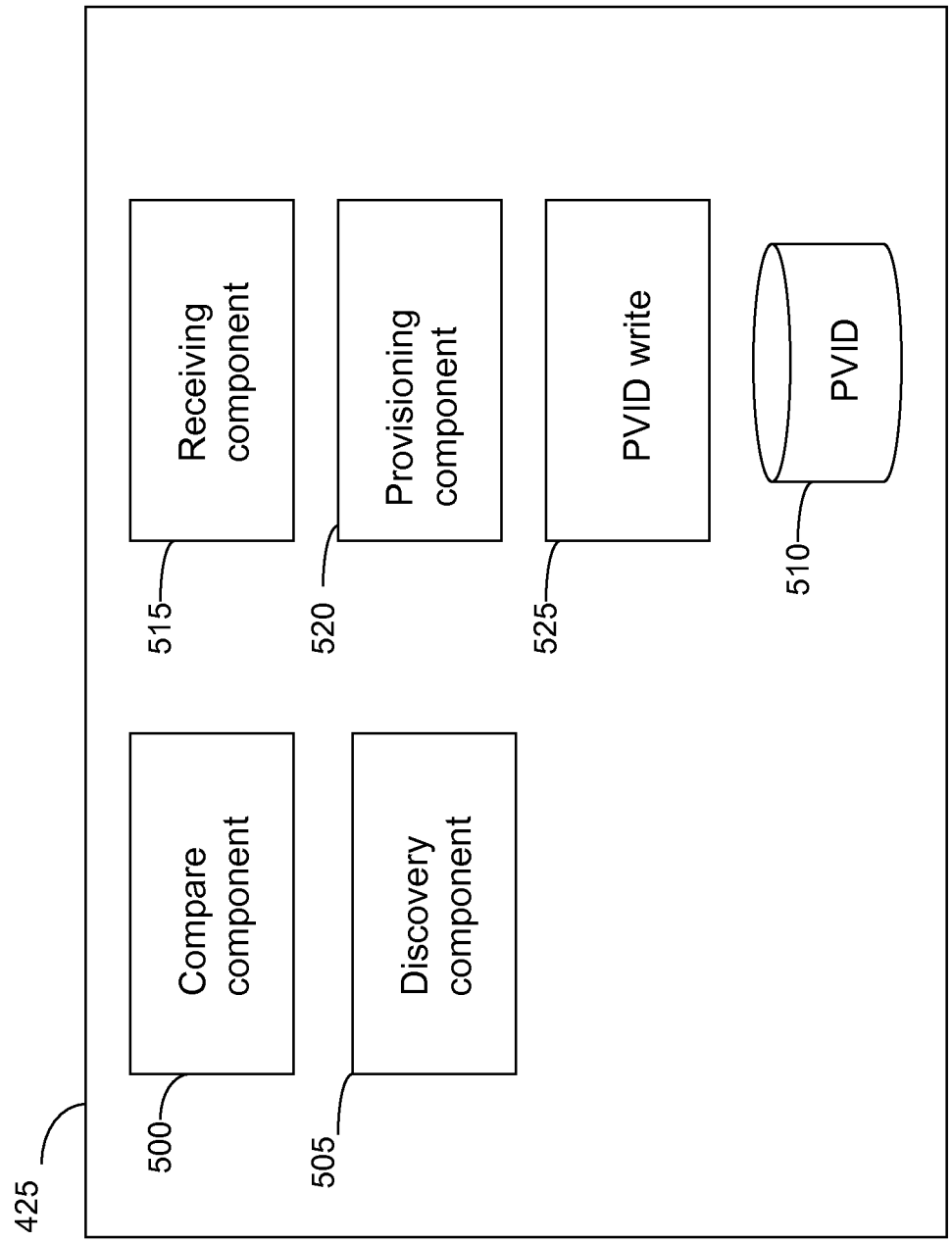
FIG. 5 is a block diagram of the components of a configuration module of the modified provisioning tool, in accordance with a preferred embodiment of the present invention.

In order to discuss the functionality of the modified provisioning tool 300 reference should also be made to FIGS. 4, 5 and 6. The modified provisioning tool 300 comprises a receiving component 400, a data store of storage templates 405, a data store of configuration data 410, a discovery component 420, a communication component 425, a policy engine 430 and a configuration component 425. Each of these components interfaces and interacts with the other in order to successfully provision storage 125, 130 to one or more virtual servers 205.

The receiving component 400 receives an external request to provision storage to a virtual server (step 600). Typically, the receiving component 400, via a graphical user interface (not shown), presents a list of storage templates 405 for selection. For example, a storage template 405 may define that a required storage volume 170 is located on a particular storage device 125, 130 having characteristics of a certain type and a storage capacity of 20 GB. The request will also state that a file system should be written to the identified storage volume 170 and which virtual server 205 the storage volume 125, 130 should be assigned to.

On receipt of a request by the receiving component 400 the policy engine 430 determines, based on the information defined in the configuration data 410, whether a storage device 125, 130 exists in the SAN 100 with the required capacity to host a storage volume 170 with the required characteristics.

The configuration data store 410 stores topology information associated with the SAN 100. By this it is meant that the totality of the information provides a model of the physical environment of the SAN 100. The model defines how the physical storage 125, 130 is connected to a physical server 140, for example which port the storage device 125, 130 is connected to on the physical server 140 and what storage devices 125, 130 are available for use etc. The configuration data 410 interfaces with a discovery component 420 which periodically transmits a discovery message across the SAN 100 to determine the current physical state of the SAN 100 and updates the information if any changes have been detected.

To provision a storage volume 170 to a physical server 140, the communication component 415 transmits a request to the storage device 125, 130 to create a new storage volume 170 of the required storage capacity (step 605). The storage device 125, 130 returns to the communication component 415 that a storage volume 170, for example, named 'VOL5' has been created. The communication component 415 on receipt of the storage volume's 170 name requests that the storage device 125, 130 returns further information associated with the storage volume 170. In particular, the storage device 125, 130 returns the universal identifier (UID) associated with the storage volume 170 (step 610).

Typically, the UID is a thirty-two bit hexadecimal code which uniquely identifies one storage volume 170 from another. In the preferred embodiment this is the IEEE UID.

With reference to FIG. 5, the storage device 125, 130 passes back to the receiving component 515 of the configuration component 425 the UID. The UID is stored in the configuration data 410 along with any other information associated with the storage volume 170. For example, the storage volume 170 may have a name 'VOL5' and a unique identifier of '1020'.

The provisioning component 520 instructs a volume manager on the storage volume 170 to create and set up the storage volume 170 using standard techniques, such as LUN masking or LUN mapping (these techniques perform the same function)(step 615).

The provisioning module 520 transmits a request to the storage device 125, 130 to map the newly created volume 'VOL5' to the physical server 140. An optional step would be for the provisioning component 520 to transmit a request to the management server 140 of the SAN 100, to configure the network to allow communication between the storage device 125, 130 and the physical server 140.

Next, the hypervisor 200 needs to be able to access the newly created storage volume 170. However, although the storage device 125, 130 itself may have storage volumes 170 'VOL1', 'VOL2', 'VOl3', 'VOL4' and 'VOL5' mapped to the physical server 140—the hypervisor 200 will only be aware of volumes 'VOL1', 'VOL2', 'VOL3' and 'VOL4' and not the newly created volume 'VOL5'.

Thus, the provisioning component 520 sends a request to the hypervisor 200 to request the hypervisor 200 to perform a discovery operation to determine which storage volumes are visible (step 620). In this example the hypervisor 200 will return, for example, names 'A', 'B', 'C', 'D' and 'E' as the hypervisor's name/alias for the storage volumes 170 it can view (step 625).

The discovery component 505 on receipt of each of the device names from the hypervisor 200 requests the hypervisor 200 to return further information associated with each device it can see.

In particular, for each storage volume 170, known to the hypervisor 200 as devices 'A', 'B', 'C', 'D' and 'E' the hypervisor 200, under the instruction of the discovery component 505, queries each device 'A', 'B', 'C', 'D' and 'E' for the universal identifier (UID) of its associated storage volume 170. This returns to the discovery component 505 a list of device names and UIDs.

In this example, the device 'E' returns the UID '1020'. This information is returned to the compare component 500 wherein, the compare component 500 retrieves the UID '1020' associated with 'VOL5' on the storage device 170 from the configuration data store 410. The compare component 500 then compares the UID '1020' of 'VOL5' with each of the UIDs retrieved from the storage volumes 170 that the hypervisor 200 can view in order to find a matching UID (step 630).

Once a match for the UID '1020' is located for one of the storage volumes 170 that the hypervisor 200 can view, the compare process stops. This, in the example, the hypervisor device named 'E' has the UID '1020' and this matches with the UID of storage volume 'VOL5'. The relationship between storage volume 'VOL5' on the storage device 125, 130 and the hypervisor device named 'E' is stored in the configuration data store 410 (step 635). The determination of this relationship shows that the provisioning of the storage volume 125, 130 to the hypervisor 200 has been completed successfully.

Thus at this stage the hypervisor 200 can see and access all storage volumes that are available to it via the physical server 140 and physical storage device 125, 130.

Now the storage volume 125, 130 can be mapped to the appropriate virtual server 205 so that the virtual server 205 can access the storage volume 170.

Next, the newly created storage volume 170 needs to be made available to the virtual server 205, to which it is to be assigned. It is important to note that at this level the hypervisor 200 masks to the virtual server 205 some of the complexities associated with the newly created storage volume 170.

To explain further, although at the hypervisor 200 level a storage device 'E' is visible with an associated UID—this information is not 'populated up' to the appropriate virtual server 205. A virtual server 205 only knows that, for example, a generic 20 GB volume is now available for use and a query of the volume 170 will not return the UID from the storage device 125, 130.

Thus, to provide an identifier that can be used by the virtual server 205 to identify the storage volume 125, 130, the physical volume identifier (PVID) component 525 requests that the hypervisor 200 writes a physical volume identifier to the volume 170 (step 640). This process is carried out in parallel to any preceding hypervisor 200 discovery step. Thus, as a storage volume 170 is discovered on the hypervisor 200 and the associated hypervisor device name, a PVID is written to the volume's first disk sector. The PVID identifier is also written to the configuration data 410 associated with the storage volume 125, 130 and hypervisor device name. For example the PVID written to device 'E' is '2023'.

Thus, once the provisioning component 520 has requested that the hypervisor 200 map the newly created storage volume 170 to the appropriate virtual server 205, the provisioning component 520 requests the virtual server 205 to discover which storage volumes it can view (step 645). (Using a similar process to that used for hypervisor volume discovery) For example, the virtual server 205 may return the following device names:
Storage volume: 1
Storage volume: 2
Storage volume: 3

However, the virtual server 205 does not know which out of storage volumes 1, 2 and 3 is storage volume 'VOL5' or 'E' as it is known to the hypervisor 200. Unique identification of 'VOL5' is required at the virtual server 205 to ensure that subsequent operations such as the creation of a file system are performed on the correct volume.

Thus the discovery component 505 requests the virtual server 205 to return each of the storage volume's PVID 510 (step 650).

For example:
Storage volume: 1 PDID:2021
Storage volume: 2 PDID:2022
Storage volume: 3 PDID:2023

The compare component 500 performs a look up in the configuration data store 410 and locates the PVID for device 'E' and compares the PVID with each of the PVIDs returned by the virtual server 205 to identify an identical PVID (step 655). If an identical PVID is found then the storage volume 170 has successfully been mapped to the virtual server 205 (step 660). The matching process is stopped and the relationship between the device name on the virtual server 205 and the storage volume 170 on the storage device 205 is recorded in the configuration data store 410 (step 665). In this example the match is determined to be with the storage volume '3' on the virtual server and with device 'E' on the hypervisor 200 and hence with storage volume 'VOL5' on the storage device 205.

The determination of this relationship shows that the provisioning of the storage volume 170 to the virtual servers 205 has been completed successfully. The final step of the provisioning process is for the provisioning component 520 to create a file system on the virtual server's volume '3' as defined by the selected storage template.

The invention claimed is:

1. A provisioning apparatus operable with a virtualization layer in a server, for provisioning a storage volume associated with a physical storage device to a virtual server in a storage area network, the provisioning apparatus comprising:
   at least one computing device, including:
   a receiving component for receiving an instruction to create a storage volume on an attached storage device, the instruction comprising at least one requested characteristic of the attached storage device;
   a discovery component for transmitting a request to the virtualization layer to identify one or more storage devices having characteristics matching the characteristics requested in the received instruction;
   in response to identification of a storage device having matching characteristics, a communication component transmitting a request to the storage device to create a storage volume with the characteristics;
   a receiving component for receiving a first unique identifier associated with the created storage volume from the storage device;
   a discovery component for performing a discovery operation, by the virtualization layer, to determine one or more storage volumes that are visible to the virtualization layer and receiving from each of the one or more storage volumes a second unique identifier associated with the located storage volume;
   a comparing component for determining from configuration data associated with each located storage volume the second unique identifier associated with each located storage volume;
   a comparing component for comparing the first unique identifier received from the virtualization layer with each of the second unique identifiers associated with the configuration data to find a matching identifier;
   in response to a matching identifier being identified, a compare component performing a lookup in the configuration data for a physical volume identifier associated with the matching identifier; and
   an identification component for identifying from the configuration data an identical mapping between a first physical volume identifier and a second physical volume identifier received from the virtual server, in order to identify a corresponding mapping between the storage volume visible to the virtual server, the virtualization layer, and attached storage volume having the characteristics.

2. An apparatus as claimed in claim 1, wherein, if a matching first unique identifier is located, the identified match is recorded in the configuration data.

3. An apparatus as claimed in claim 1, wherein the first unique identifier is written to a sector of the storage volume by the virtualization layer on creation of the storage volume.

4. An apparatus as claimed in claim 1, wherein the virtualization layer comprises a hypervisor.

5. An apparatus as claimed in claim 1, further comprising a component for transmitting a request to a storage device to identify one or more storage volumes created on the storage device.

6. An apparatus as claimed in claim 5, wherein the component receives from the storage device a third unique identifier associated with each identified storage volume.

7. An apparatus as claimed in claim 6, wherein the third unique identifier is written to the configuration data associated with each identified storage volume by the discovery component.

8. An apparatus as claimed in claim 7, further comprising a further discovery component for instructing the virtualization layer to identify one or more storage volumes created on the storage device.

9. An apparatus as claimed in claim 7, wherein the further discovery component receives from each of the storage volumes a fourth unique identifier, and wherein the apparatus comprises a further comparing component for requesting from the configuration data the second unique identifier associated with each storage volume and the further comparing component being operable for comparing the fourth unique identifier with the second unique identifier to locate a matching identifier.

10. An apparatus as claimed in claim 9, wherein, if a matching second unique identifier is located, the further comparing component records the identified match in the configuration data.

11. A method of provisioning a storage volume associated with a physical storage device to a virtual server in a storage area network, the provisioning method comprising:
receiving an instruction to create a storage volume on an attached storage device, the instruction further comprising at least one requested characteristic of the attached storage device;
transmitting a request to a virtualization layer to identify one or more storage devices having characteristics matching the characteristics requested in the received instruction;
transmitting a request to the storage device to create a storage volume with the characteristics, in response to identification of a storage device having matching characteristics;
receiving a first unique identifier associated with the created storage volume from the storage device;
performing a discovery operation, by the virtualization layer, to determine one or more storage volumes that are visible to the virtualization layer and receiving from each of the one or more storage volumes a second unique identifier associated with the located storage volume;
determining from configuration data associated with each located storage volume the second unique identifier associated with each located storage volume;
comparing the first unique identifier received from the virtualization layer with each of the second unique identifiers associated with the configuration data to find a matching identifier;
performing a lookup in the configuration data for a physical volume identifier associated with the matching identifier, in response to a matching identifier being identified; and
identifying from the configuration data an identical mapping between a first physical volume identifier and a second physical volume identifier in order to identify a corresponding mapping between the storage volume visible to the virtual server, the virtualization layer, and attached storage volume having the characteristics.

12. A method as claimed in claim 11, wherein, if a matching first unique identifier is located, recording the identified match in the configuration data.

13. A method as claimed in claim 11, further comprising writing a first unique identifier to a sector of each storage volume by the virtualization layer on creation of the storage volume.

14. A method as claimed in claim 11, wherein the virtualization layer comprises a hypervisor.

15. A method as claimed in claim 11, further comprising transmitting a request to a storage device to identify one or more storage volumes created on the storage device.

16. A method as claimed in claim 15, wherein the transmitting further comprises receiving from the storage device a third unique identifier associated with each identified storage volume.

17. A method as claimed in claim 16, further comprising writing to the configuration data the third unique identifier associated with each identified storage volume.

18. A method as claimed in claim 17, further comprising instructing the virtualization layer to identify one or more storage volumes created on the storage device.

19. A method as claimed in claim 17, further comprising receiving from each of the storage volumes a fourth unique identifier, requesting from the configuration data the second unique identifier associated with each of the storage volumes, and comparing the fourth unique identifier with the second unique identifier to locate a matching identifier.

20. A method as claimed in claim 19, wherein, if a matching second unique identifier is located, the method further comprising recording the match in the configuration data.

21. A computer program product stored on a non-transitory computer readable storage medium, comprising software code portions for performing, when said product is run on a computer, a method of provisioning a storage volume associated with a physical storage device to a virtual server in a storage area network, the method comprising:
receiving an instruction to create a storage volume on an attached storage device, the instruction further comprising at least one requested characteristic of the attached storage device;
transmitting a request to a virtualization layer to identify one or more storage devices having characteristics matching the characteristics requested in the received instruction;
transmitting a request to the storage device to create a storage volume with the characteristics, in response to identification of a storage device having matching characteristics;
receiving a first unique identifier associated with the created storage volume from the storage device;
performing a discovery operation, by the virtualization layer, to determine one or more storage volumes that are visible to the virtualization layer and receiving from each of the one or more storage volumes a second unique identifier associated with the located storage volume;
determining from configuration data associated with each located storage volume the second unique identifier associated with each located storage volume;
comparing the first unique identifier received from the virtualization layer with each of the second unique identifiers associated with the configuration data to find a matching identifier;

performing a lookup in the configuration data for a physical volume identifier associated with the matching identifier, in response to a matching identifier being identified; and identifying from the configuration data an identical mapping between a first physical volume identifier and a second physical volume identifier in order to identify a corresponding mapping between the storage volume visible to the virtual server, the virtualization layer, and attached storage volume having the characteristics.

* * * * *